United States Patent [19]

Patel

[11] Patent Number: 5,023,806
[45] Date of Patent: Jun. 11, 1991

[54] TELECOMMUNICATION SYSTEM FOR REMOTE LP GAS INVENTORY CONTROL

[76] Inventor: Naresh P. Patel, Rte. 5, Box 151P, Denton, Tex. 76201

[21] Appl. No.: 332,682

[22] Filed: Apr. 3, 1989

[51] Int. Cl.⁵ .............................................. G01F 23/38
[52] U.S. Cl. .................................... 364/509; 340/625; 73/317; 379/106
[58] Field of Search ........................ 73/314, 317, 306; 379/106; 364/509; 340/625, 870.02

[56] References Cited

U.S. PATENT DOCUMENTS

| | | | |
|---|---|---|---|
| 2,795,955 | 7/1957 | Hall | 73/317 |
| 3,320,805 | 5/1967 | Kahle | 73/317 |
| 3,989,898 | 11/1976 | Dugan et al. | 379/107 |
| 4,313,114 | 1/1982 | Lee et al. | 340/870.02 X |
| 4,387,434 | 6/1983 | Moncrief, Jr. et al. | 364/509 |
| 4,469,917 | 9/1984 | Shelley | 379/107 |
| 4,486,625 | 12/1984 | Reinauer et al. | 379/107 |
| 4,554,494 | 11/1985 | Howeth | 73/314 X |
| 4,682,169 | 7/1987 | Swanson | 379/107 X |
| 4,688,028 | 8/1987 | Conn | 73/317 X |
| 4,788,648 | 11/1988 | Ferretti et al. | 364/509 |
| 4,833,618 | 5/1989 | Verma et al. | 379/107 X |
| 4,845,486 | 7/1989 | Knight et al. | 340/625 X |

Primary Examiner—Parshotam S. Lall
Assistant Examiner—S. A. Melnick
Attorney, Agent, or Firm—Crutsinger & Booth

[57] ABSTRACT

A computerized system for sensing the level of liquefied gas in a tank at a remote location and transmitting data between the location of the tank and the computer to maintain files for inventory control. A microprocessor collects electrical signals from a tank mounted transducer, which is actuated by a float gauge, and periodically sends data over telephone lines to a computer located remotely from the tank. The computer receives and processes data during time windows established for each of a group of tanks to provide current data regarding the supply of liquefied gas in the tanks.

14 Claims, 13 Drawing Sheets

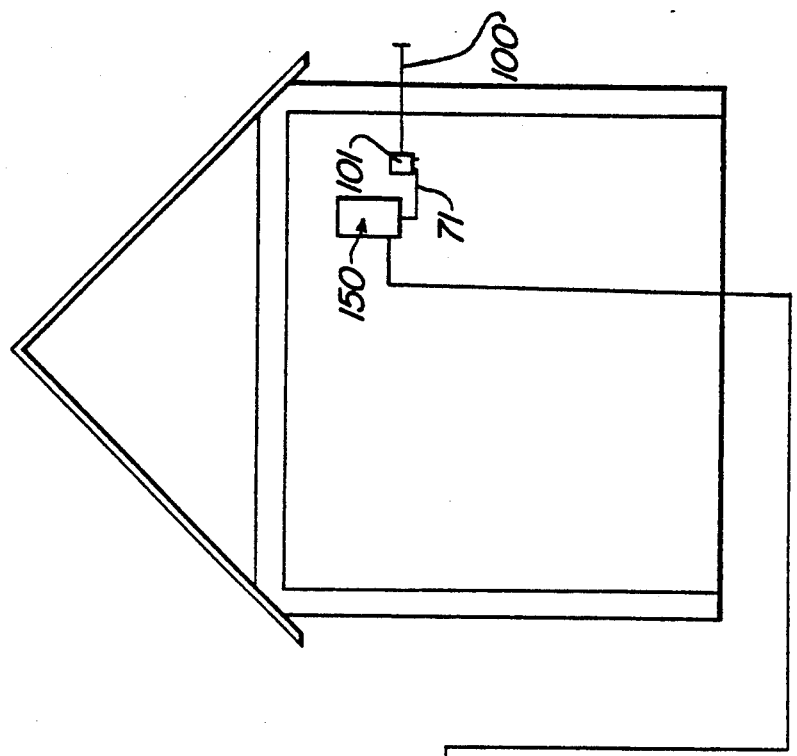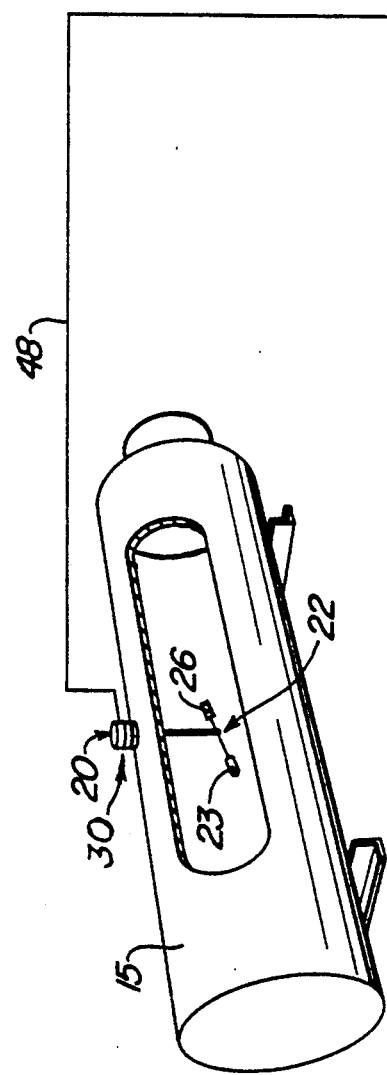
FIG. 2

FIG. 14

22
Customer Name: Petrolane Inc.        Unit I.D.: 00021 Type of Unit: 1
Unit Address: 1234 Anywhere, USA
Type of Account: Industrial Storage
Date of Installation: 11/13/89
Tank Details: Everywhere Tank Storage Facility
Tanks Monitored: 4

| Tank #: | Tank Type: | Tank Size: | Present Level (%) | Present Level (gals.) |
|---|---|---|---|---|
| 1 | | 15000 | 91 | 13650 |
| 2 | | 15000 | 08 | 02000 |
| 3 | | 15000 | 08 | 02000 |
| 4 | | 15000 | 08 | 02000 |

Total Current Tank Level : 13650
Sunday, 02/10/00, 00:00:00

TELECOMMUNICATION SYSTEM FOR REMOTE LP GAS INVENTORY CONTROL

TECHNICAL FIELD

A remote liquid level sensor for liquefied gas tanks which sends information regarding the level of fuel in the tank over telephone lines to a computer at a supply facility.

BACKGROUND OF THE INVENTION

Liquid propane gas, often referred to as LP gas, is commonly used as a source of fuel for residential and industrial uses. Heretofore, float gauges, for example, of the type disclosed in U.S. Pat. No. 2,098,085, have been installed on LP gas tanks to provide a visual readout of the percentage of fuel remaining in the tank. However, it has been necessary to make a trip to the location of the LP gas tank to read the gauge and determine the volume of fuel remaining in the tank.

When the volume of fuel in a tank is depleted, the customer must be present in order for the tank to be refilled to assure that pilot lights have been ignited and that gas valves have not been left open.

Distributors of LP gas send delivery trucks to fill tanks when a customer calls. The erratic scheduling of LP gas delivery trucks is inefficient because several trips are generally made to the same area at different times. Further, since suppliers of LP gas have not had information regarding when and where a customer may request delivery of fuel, information has not been available to the supplier for maintaining required inventories of LP gas.

SUMMARY OF INVENTION

A remote level sensing apparatus to automatically indicate the level of liquefied gas in a tank over telephone lines is disclosed. A float in the tank is connected to a magnetic field generating apparatus to move the magnetic field generating apparatus as the level of liquefied gas in the tank changes. Hall-effect transducers are secured outside the tank in a predetermined relationship to the magnetic field generating apparatus to deliver electrical signals in response to a change in the level of liquefied gas in the tank. A computer located remotely from the tank receives and processes data during time windows established for each of a group of tanks to provide current data regarding the supply of LP gas in tanks.

DESCRIPTION OF DRAWINGS

Drawings of a preferred embodiment of the invention are annexed hereto, so that the invention may be better and more fully understood, in which:

FIG. 2 is a schematic perspective view of an LP gas tank and a building associated with the remote level sensing apparatus;

FIG. 14 is an illustration of a typical computer screen used in the LP gas inventory control system.

Numeral references are employed to designate like parts throughout the various figures of the drawing.

DESCRIPTION OF A PREFERRED EMBODIMENT

Figure 1:
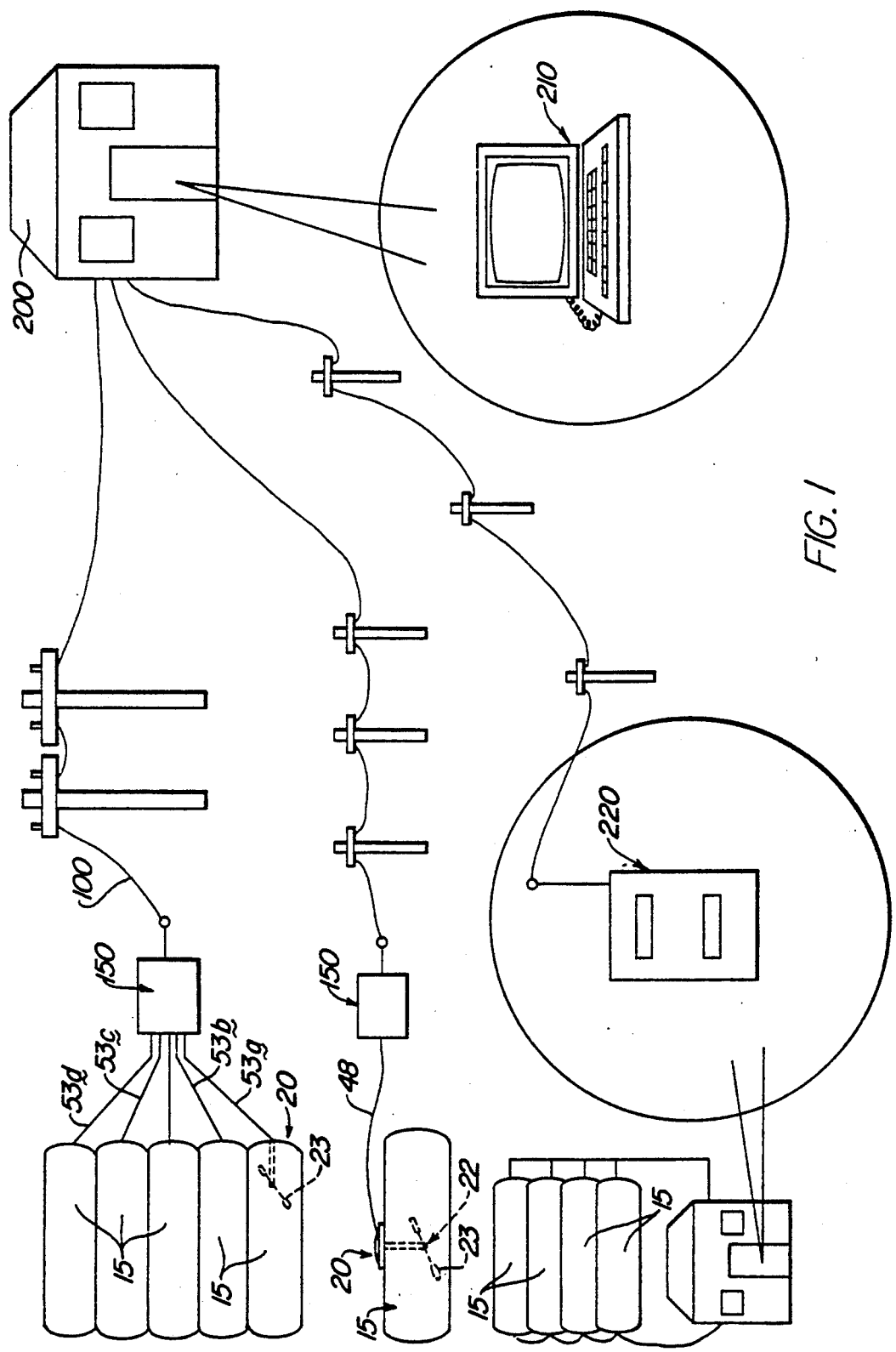
FIG. 1 is a schematic view of a plurality of LP gas tanks and the remote level sensing apparatus associated with a central computer facility.

Referring to FIGS. 1 and 2 of the drawing, the numeral 20 generally designates a remote level sensing unit comprising a float gauge assembly 22 mounted on a liquid propane tank 15 for delivering electrical signals from a transducer unit 30 through a four conductor cable 48 to signal transmitting interface unit 50 connected to a telephone line 100. Transducer unit 30 is adapted to sense the liquid level and deliver a signal indicating the liquid level.

The purpose of the remote level sensing unit 20 is to augment distribution of liquid propane gas such that an accurate field LPG inventory can be obtained quickly and efficiently. A signal can be obtained from each LP tank 15 when the level of liquid in the tank reaches a predetermined level.

Each remote level sensing unit 20 interfaces with a telephone line 100 and renders its services inconspicuously at a predetermined time when no one is expected to be using the telephone line, for instance, at 2:00 a.m. in the morning. In the event that the telephone line is busy, data collected from the remote level sensing unit 20 is stored in RAM memory in the sender interface in signal transmitting interface units 150 for transmission to a central base station 200 at a later preselected time, for example, anytime before 4:00 a.m. If by 4:00 a.m. contact has not been made with the central base station 200, the system will abort any further attempts until, for example, 2:00 a.m. the following day.

As will be hereinafter more fully explained, programming a computer in the central base station 200 in conjunction with programming of signal transmitting interface units 150 permits the assignment of time windows to permit preselected groups of signal transmitting interface units 150 to access the computer at the central base station 200 systematically.

Figure 3:
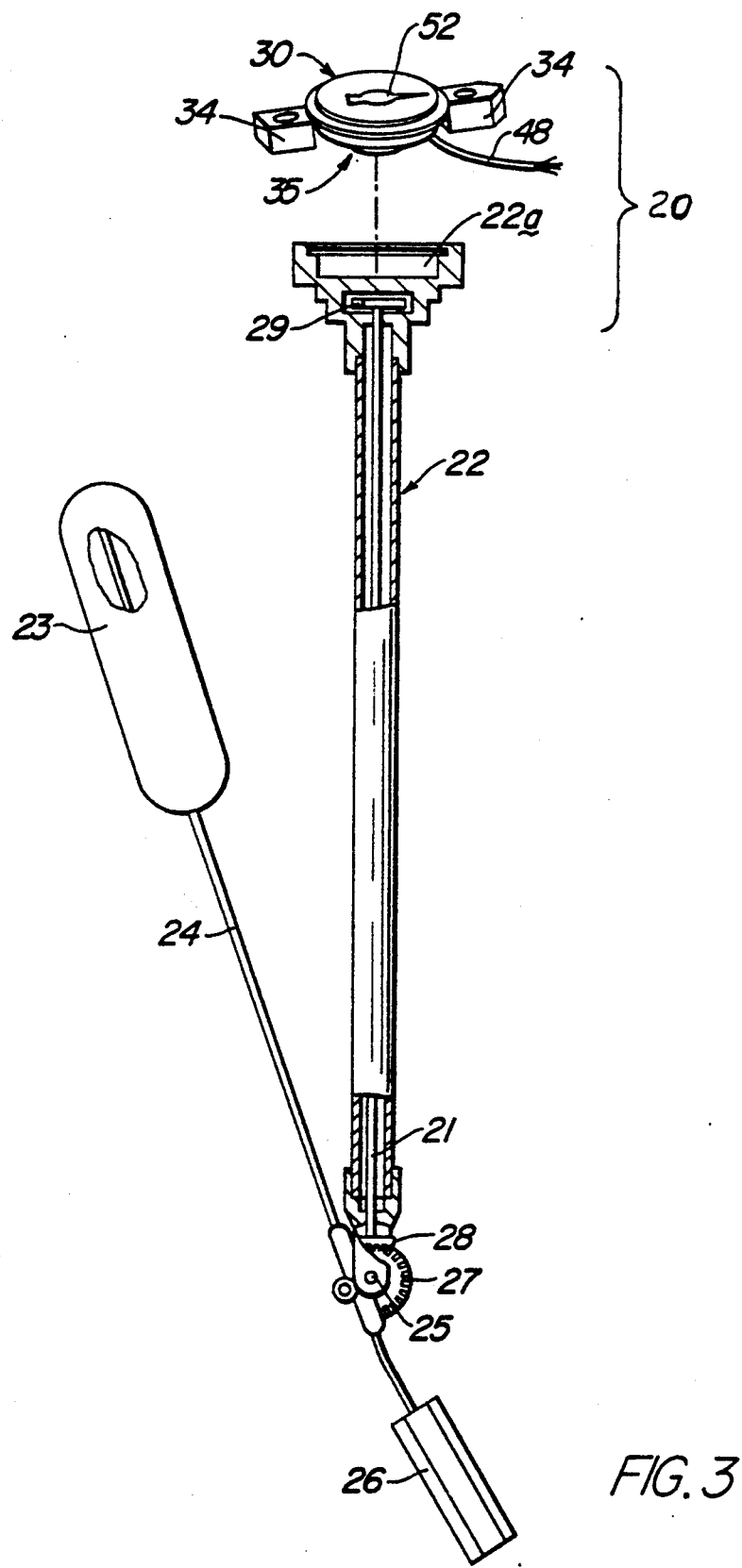
FIG. 3 is an exploded elevational view of a float gauge and sender unit.

The remote level sensing unit 20 is best illustrated in FIG. 3 of the drawing and comprises a float gauge assembly 22 and a transducer unit 30. The float gauge assembly 22 is of conventional design and forms no part of the present invention except in combination with the transducer 30. Float gauge assembly 22 is commercially available from Squibb Taylor, Inc. of Dallas, Texas.

Float gauge assembly 22 comprises a float 23 and counterweight 26 secured to opposite ends of a float rod 24 which is pivotally connected through a bearing pin 25 to the body of the float gauge assembly 22. A drive gear 27 is positioned in meshing relation with a driven gear 28 mounted on the lower end of a drive shaft 21 having a drive magnet 29 secured to the upper end thereof. Vertical movement of float 23 imparts rotation to drive magnet 29. Drive magnet 29 is mounted in an aluminum die cast gauge head which is connectable able to tank 15 in conventional manner. The construction and operation of float gauge assembly 22 is well known to persons skilled in the art and further description thereof is not deemed necessary.

Figure 4:
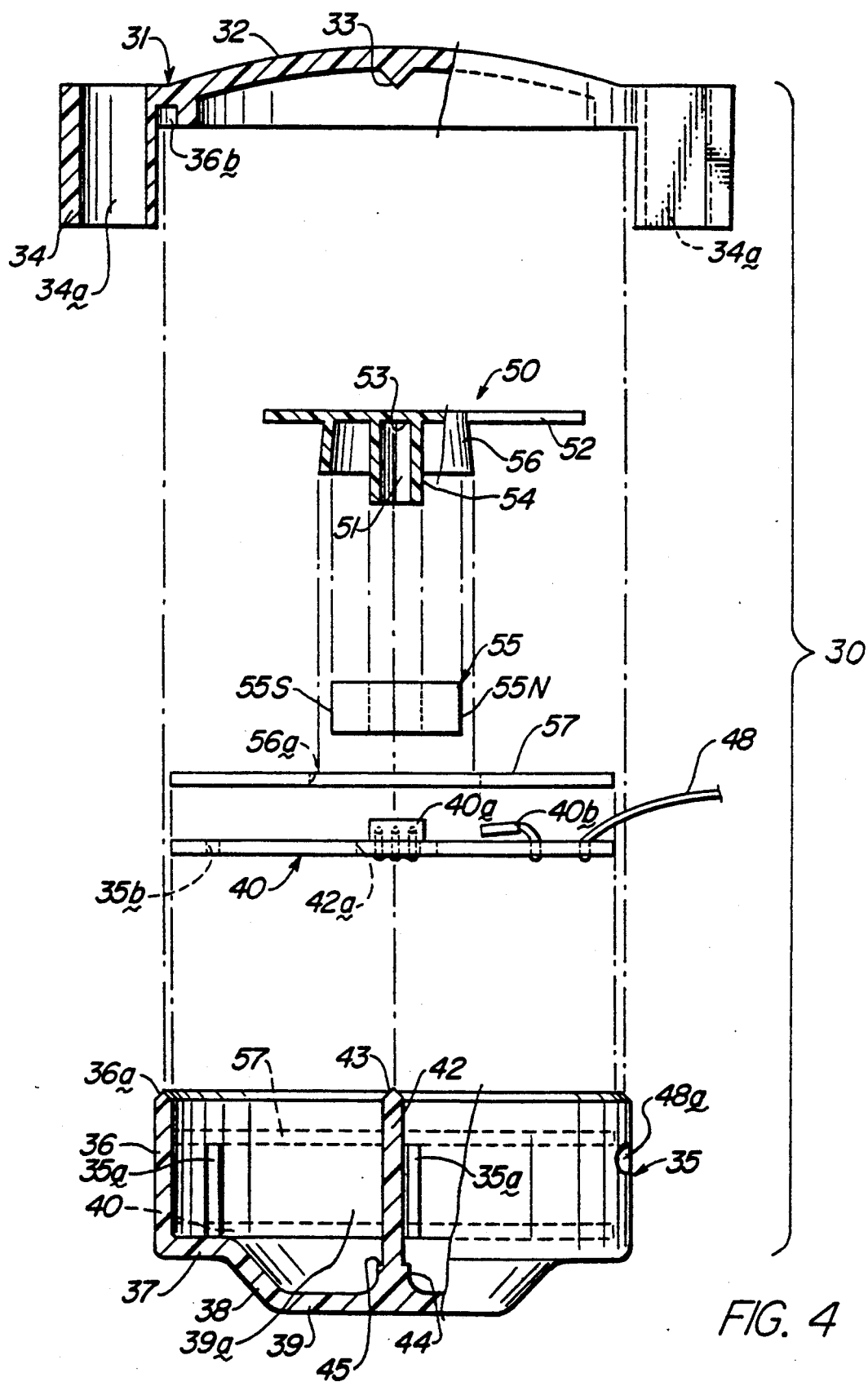
FIG. 4 is an exploded view of a sender unit.

The gauge assembly head of float gauge 22 has a receptacle 22a which receives a transducer unit generally designated by the numeral 30 in FIGS. 3 and 4 of the drawing. As best illustrated in FIG. 4 of the drawing, transducer unit 30 comprises a lens cap 31, body portion 35, needle assembly 50 and dial face 57.

Transducer housing 35 has a circular side wall 36 extending upwardly from a bottom wall 37 having downwardly inclined portions 38 which intersect with a generally circular recessed bottom wall 39 forming a cavity 39a. A central post 42 having an enlarged base portion 44 extends upwardly from the recessed bottom wall 39. The transition between the reduced diameter portion of central post 42 and the enlarged base portion 44 of the central post 42 forms a shoulder 45 intermediate opposite ends of the post. The post has a pointed upper end 43 upon which a needle assembly 50 is rotatably disposed. Needle assembly 50 comprises a horizontally disposed pointer 52 and a cylindrical tube 54 having an internal passage 51 closed at the upper end by the lower surface 53 of pointer 52. An annular skirt 56 is secured to the lower surface of pointer 52, cylindrical tube 54 and skirt 56 having a common axis extending vertically through the center of gravity of needle assembly 50.

A slave magnet 55 having a north pole 55n and a south pole 55s directly across its diameter is mounted in annular skirt 56 for imparting rotation to pointer 52 for aligning the poles of slave magnet 55 with the poles of drive magnet 29 in float gauge assembly 22. The slave magnet 55 is bonded in skirt 36 to maintain a fixed relation between the north pole 55n and pointer 52.

The upper body or lens cap 31 includes a transparent lens portion 32 having a downwardly extending conical guide surface 33 formed on the lower surface thereof and an annular groove 36b formed to receive the annularly extending upper edge 36a of side wall 36 of transducer housing 35. The lens cap 31 is sonically welded to the upper edge 36a of body portion 35. Lugs 34 extend outwardly from the periphery of the lens cap 31 and have passages 34a formed therein to receive mounting screws for securing the housing of transducer unit 30 to the outside of tank 15 such that the lower body portion 35 extends into the receptacle 22a in float gauge assembly 22.

Figure 6:
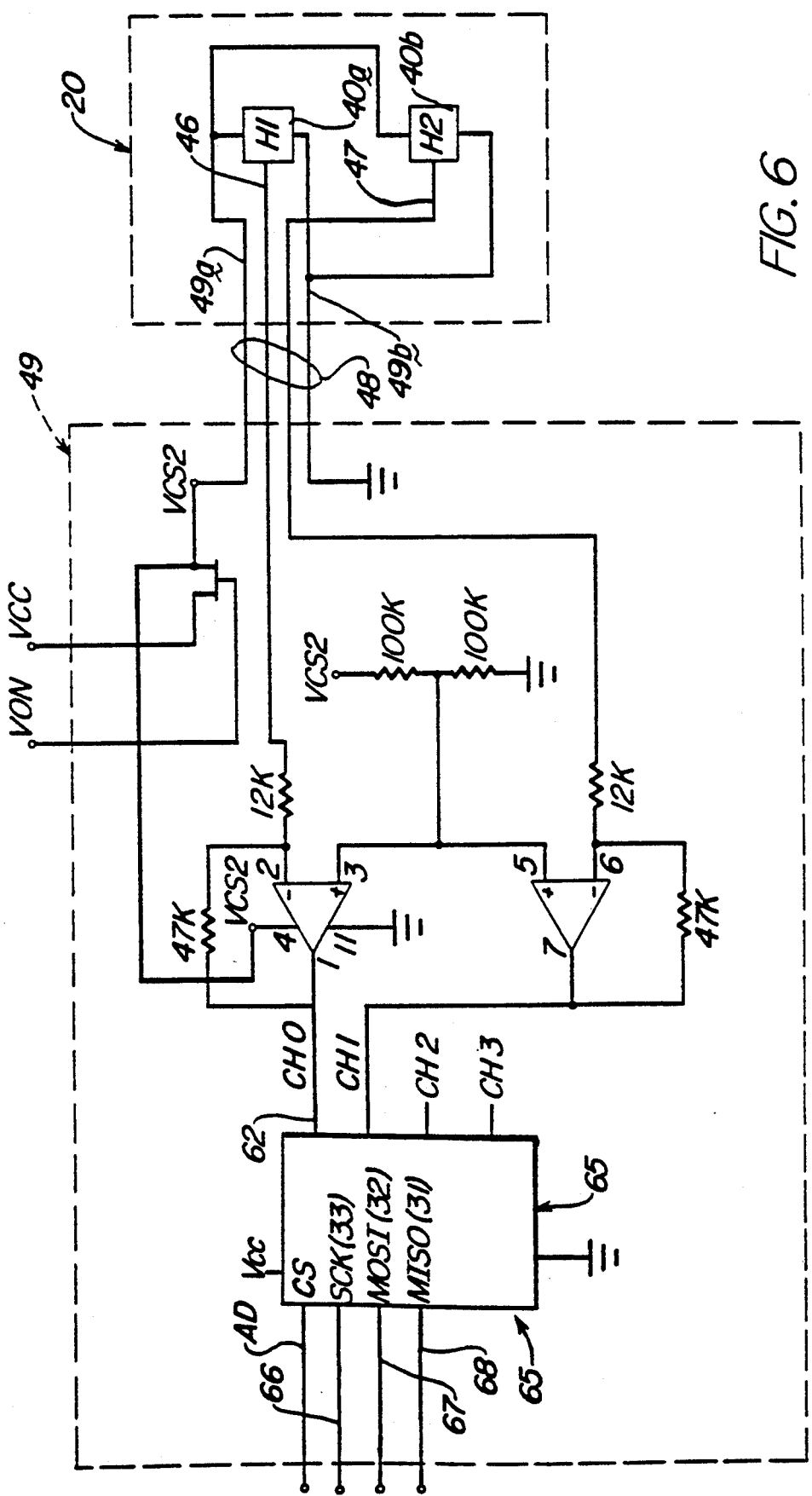
FIG. 6 is a wiring diagram of a sender unit and sender interface circuitry.

A sender circuit board, generally designated by the numeral 40 in FIG. 4 of the drawing, having passages 35b formed therein through which pegs 35a extend, is mounted in cavity 39a in transducer housing 35. Dial for 57 is supported on upper ends of pegs 35a. The transducer circuit board 40 holds two Hall-effect transducers 40a and 40b mounted perpendicular to each other. Transducer circuit board 40 is configured to position transducers 40a and 40b in a magnetic field with a plane of each transducers perpendicular to the direction of the magnetic field between drive magnet 29 and slave magnet 55. The transducer circuit board 40 and transducers 40a and 40b mounted thereon remain stationary as drive magnet 29 and slave magnet 55 rotate such that the Hall voltage through conductors 46 and 47, as illustrated in FIG. 6, produces a signal indicative of the magnetic field density which varies upon rotation of drive magnet 29 and slave magnet 55 in response to vertical movement of float 23 as the level of liquid in LP tank 15 rises or falls.

Each Hall-effect transducers 40a and 40b preferably comprises a ratiometric, linear Hall-effect transducer, for example, UGN-3503U which are commercially available from Hall-Effect Applications Engineering, Sprague Electric Company. Concord, N.H. Each Halleffect integrated circuit includes a Hall sensing element and linear amplifier on a single chip and an emitter-follower output stage. The sensors are supplied in a three-pin plastic package having a thickness of approximately 1.54 mm. An operating voltage in a range between 4.5 and 6 volts is applied through conductor 49a. The supply current through connector 49b typically is in a range between 9.0 and 14 mA.

The output voltage at the third pin of transducers 40a and 40b is preferably in a range between 2.25 volts and 2.75 volts. Conductor 46 is connected to the output pin of Hall-effect transducer 40a, as illustrated in FIG. 6, and conductor 47 is connected to the output pin of Hall-effect transducer 40b.

It should be readily apparent that Hall-effect transducers 40a and 40b are connected in parallel between conductors 49a and 49b to provide a constant operating voltage across each Hall-effect transducer 40a and 40b.

Figure 11:
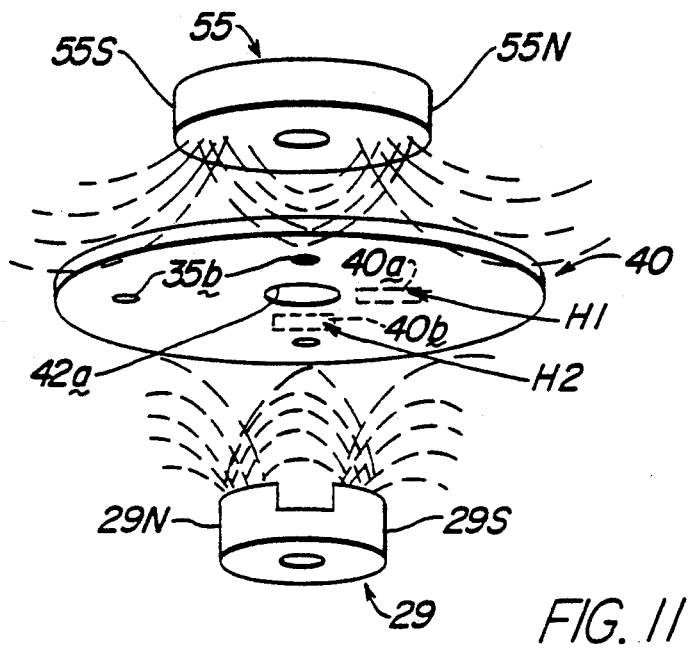
FIG. 11 is a diagrammatic exploded perspective view of a sender circuit board associated with a drive magnet and a slave magnet.
Figure 12:
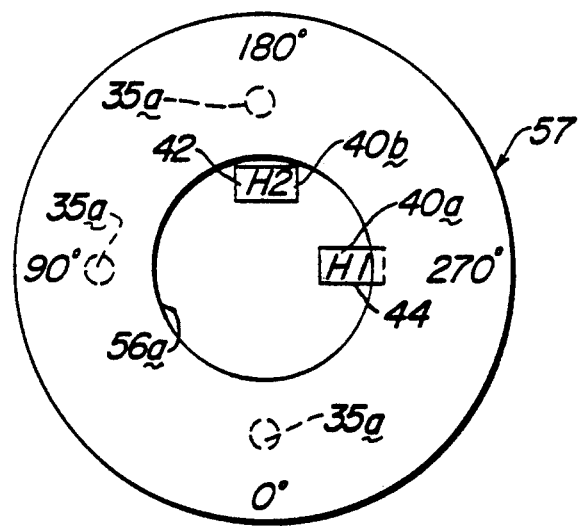
FIG. 12 is a diagrammatic view illustrating the relationship between a dial face and a sender circuit board.
Figure 13:
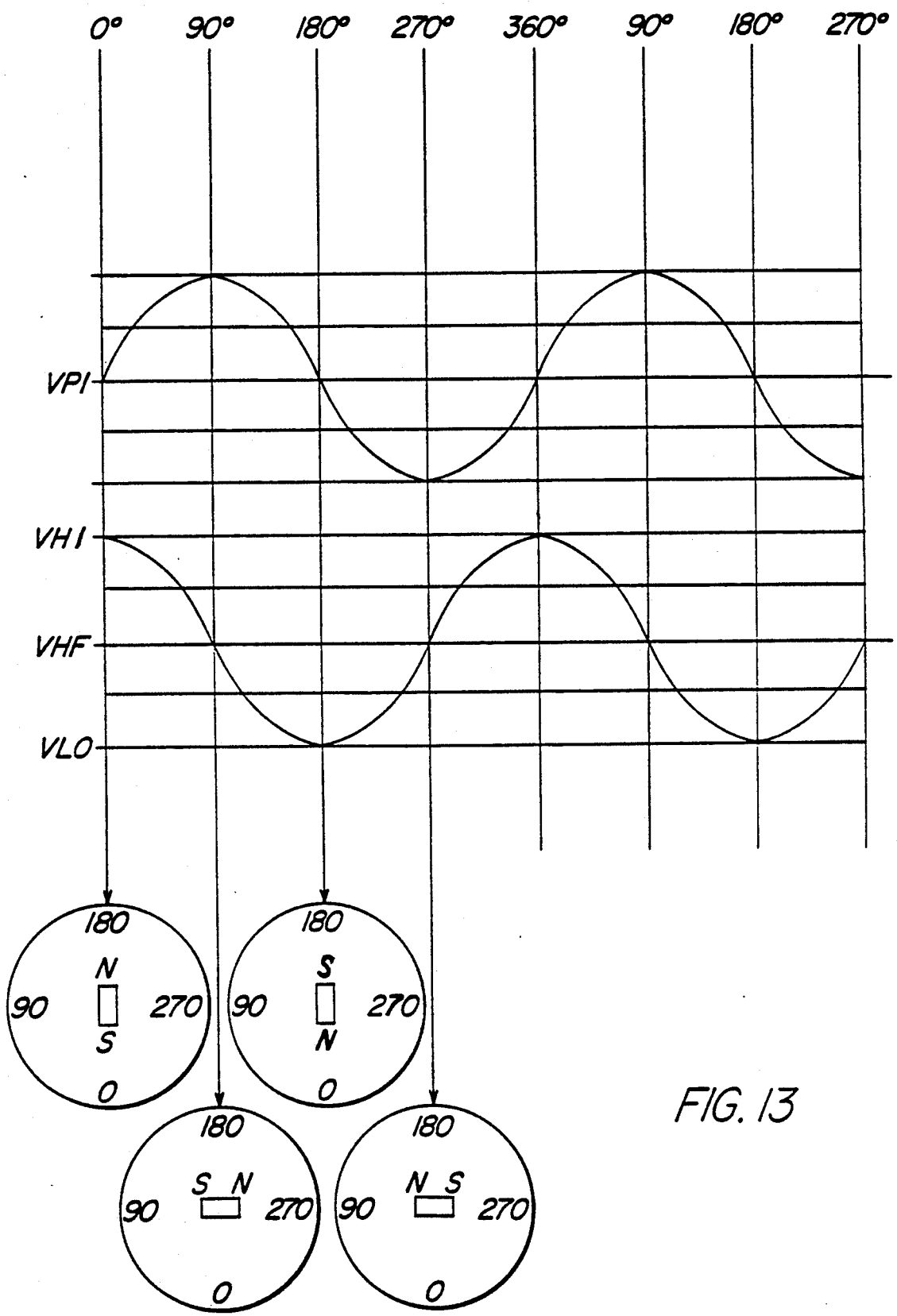
FIG. 13 is a graphic illustration of the outputs of a pair of Hall effect sensors.

As diagrammatically illustrated in FIG. 11 of the drawing, Hall-effect transducers 40a and 40b are mounted on transducer circuit board 40 and are circumferentially spaced 90° apart about the central axis through transducers circuit board 40. The output null voltage of each Hall-effect transducer 40a and 40b is normally one-half the supply voltage across conductors 49a and 49b. A south magnetic pole, presented to the face of the Hall-effect transducer, will drive the output voltage higher than the null voltage level. A north pole will drive the output below the null level as diagrammatically illustrated in FIG. 13 of the drawing.

Instantaneous and proportional output-voltage levels are dependent on magnetic flux density at the most sensitive area of the Hall-effect transducer. Output voltages of Hall-effect transducers 40a and 40b are diagrammatically illustrated in FIG. 13 of the drawing resulting from changes in magnetic flux density between drive magnet 29 and slave magnet 55 upon rotation of the magnets relative to Hall-effect transducers 40a and 40b on the stationary circuit board 40.

Further description and specifications of Hall-effect transducers are published in Hall-Effect UGN-3503U and UGS-3503U Catalog from Hall-Effect IC Operations, Sprague Electric Company, of Concord, N.H., 1985, the disclosure of which is incorporated herein by reference in its entirety for all purposes.

The purpose of Hall-effect transducers 40a and 40b is to measure the intensity and polarity of the magnetic flux propagated by the drive magnetic 29 and slave magnet 55. Based on the electrical signals, the position of the drive magnet 29 can be derived in electrical terms and hence the level of the LP in the LP tank 15. An electrical cable 48 consisting of four individual conductors, including conductors 46, 47 and conductors labeled 49a and ground 49b in FIG. 6 of the drawing are attached to printed circuit board 40 and is routed out of the transducer housing 35 through a hole 48a in the transducer housing 35. As hereinbefore described, cable 48 carries electrical power to the Hall-effect transducers 40a and 40b, through conductors 49a and 49b and also carries signals generated by the transducers through conductors 46 and 47 back to the signal transmitting interface unit 150, as will be hereinafter more fully explained.

Figure 5:
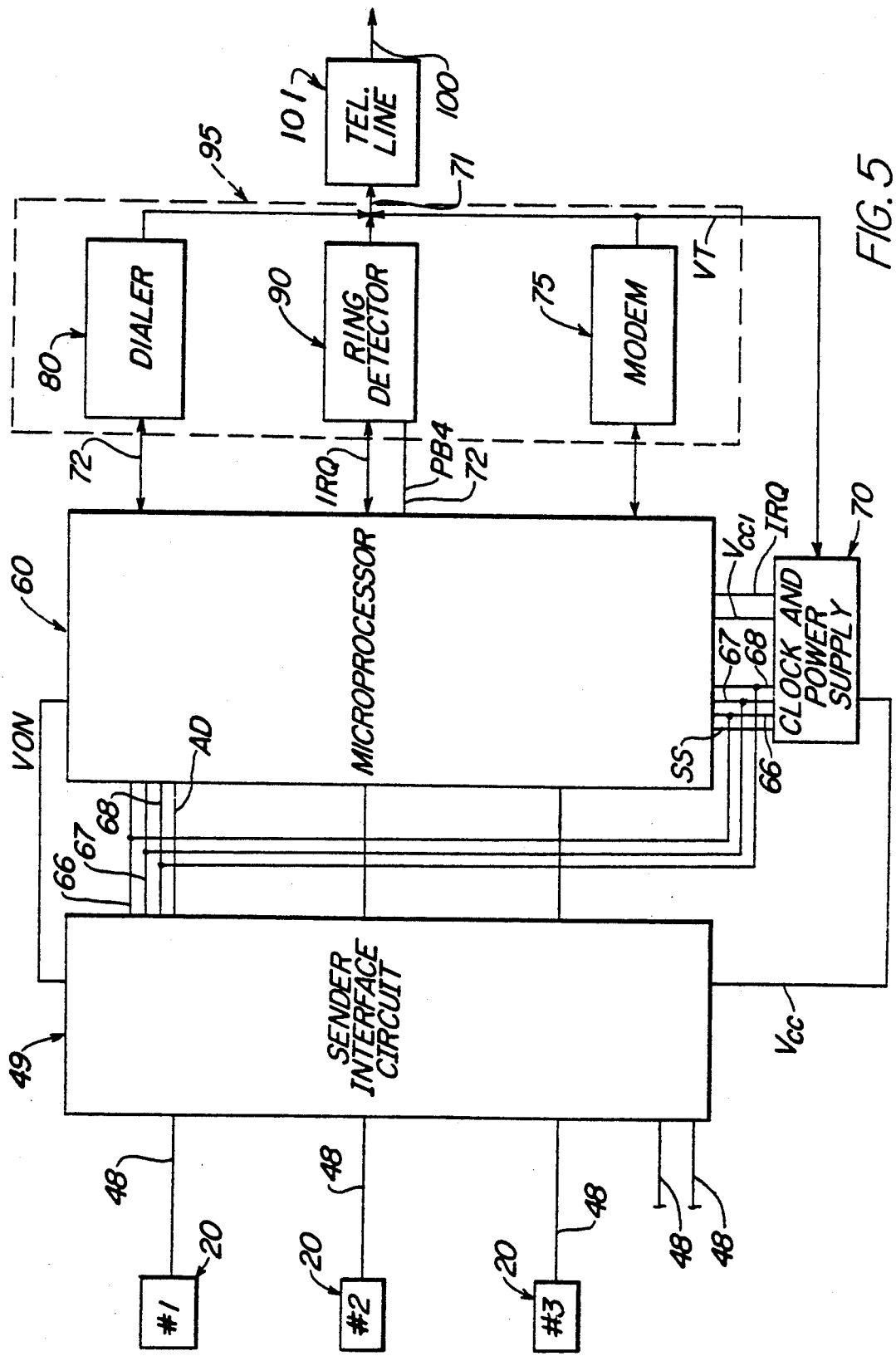
FIG. 5 is a block diagram of several sender units and signal transmitting circuit.

As illustrated in FIGS. 5 and 6 of the drawing, conductors 46, 47, 49a and 49b of cable 48 are connected to transducer interface circuitry, generally designated by the numeral 49, which includes amplifiers having output terminals CH0 and CH1 connected to terminals in an input/output card 65 which has a plurality of terminals CH2 and CH3 connectable to transducer interface circuits of transducer circuit boards 40 of additional tanks 15 to permit a single signal transmitting interface unit 150 to monitor a plurality of tanks 15. The serial input/output card 65 is commercially available from National Semiconductor Corporation as Part No. ADC0834. The serial port is an 8-bit successive approximation A/D converter with a serial input/output and configurable input multiplexers with up to 8 channels. The serial input/output is configured to comply with the serial data exchange standards for easy interface to processors, and can interface with standard shift registers.

The 2, 4 or 8-channel multiplexers are software configured for single-ended or differential inputs as well as channel assignment. The differential analog voltage input allows increasing the common-mode rejection and offsetting the analog zero input voltage value. In addition, the voltage reference input can be adjusted to allow encoding any smaller analog voltage span to the full 8 bits of resolution.

The A/D converter and serial port are described in National Semiconductor Corporation Publication No. TL/H/5583-1 at pages 3-115 through 3-124. The disclosure of the technical publication is incorporated herein by reference for all purposes.

Figure 7:
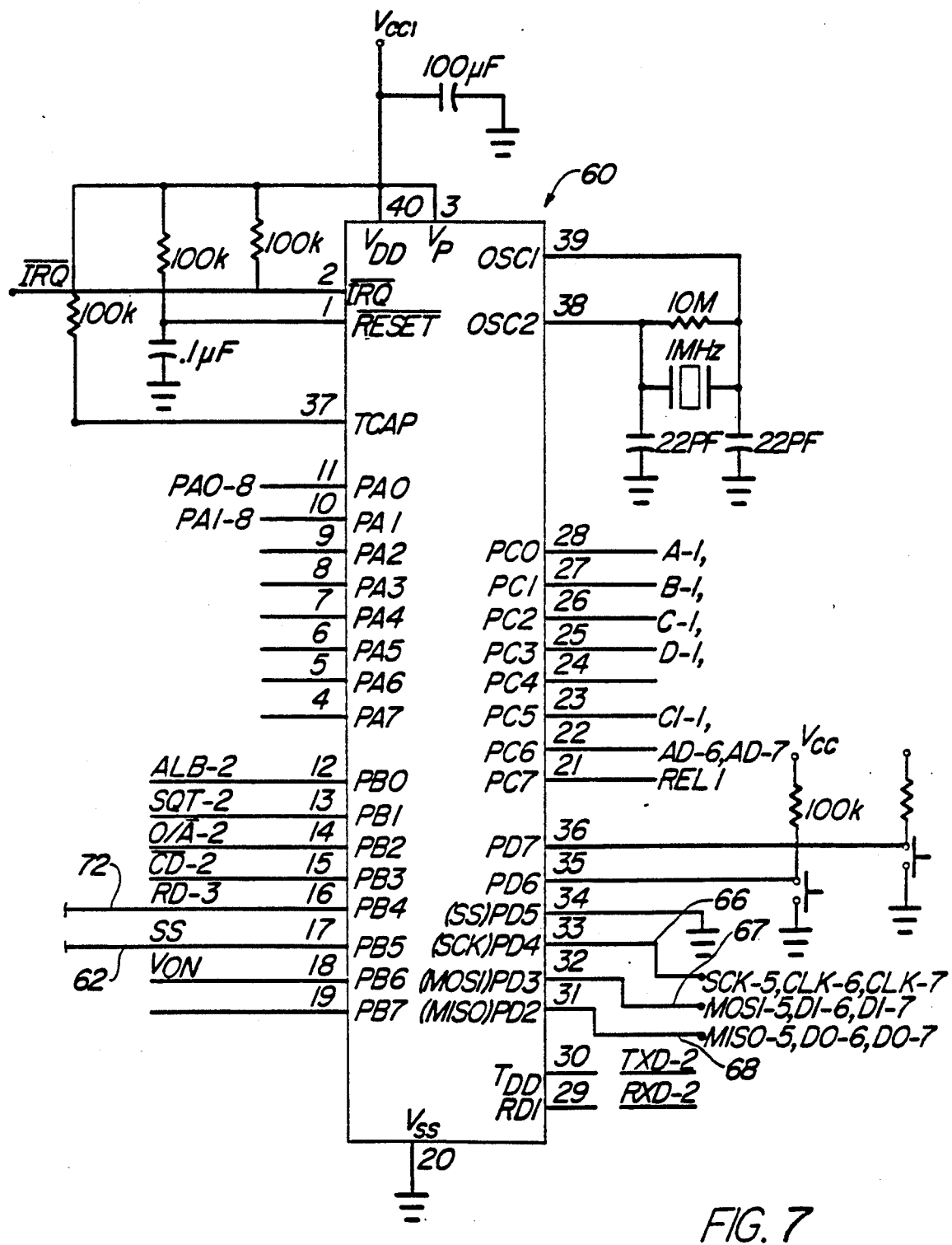
FIG. 7 is a wiring diagram of a microprocessor.

The output from the transducer interface circuit 49 is delivered through conductors 66, 67 and 68 to a microprocessor generally designated by the numeral 60 in FIGS. 5 and 7 of the drawing. Microprocessor 60 is an 8-bit single-chip microcomputer which is commercially available from Motorola, Inc. as Part No. MC68HC05C4 or Part No. MC68HC805C4.

The Motorola MC68HC05C4 HCMOS Microcomputer is an 8-bit microcomputer unit (MCU) containing an on-chip oscillator, CPU, RAM, ROM, I/O, two serial interface systems, and timer. The fully static design allows operation at frequencies down to dc, to reduce its consumption.

The Motorola MC68HC805C4 MCU device is similar to the Motorola MC68HC05C4 MCU device with several exceptions. These exceptions include 4160 bytes of EEPROM, bootstrap programming ROM, and program/breakpoint/IRQ option registers. Difference information applicable to the Motorola MC68HC805C4 MCU is provided in Appendices C and D of "Motorola Semi-Conductor Data" Catalog No. AD1991R2, dated 1985, the contents of which are incorporated herein by reference in its entirety for all purposes.

Figure 8:
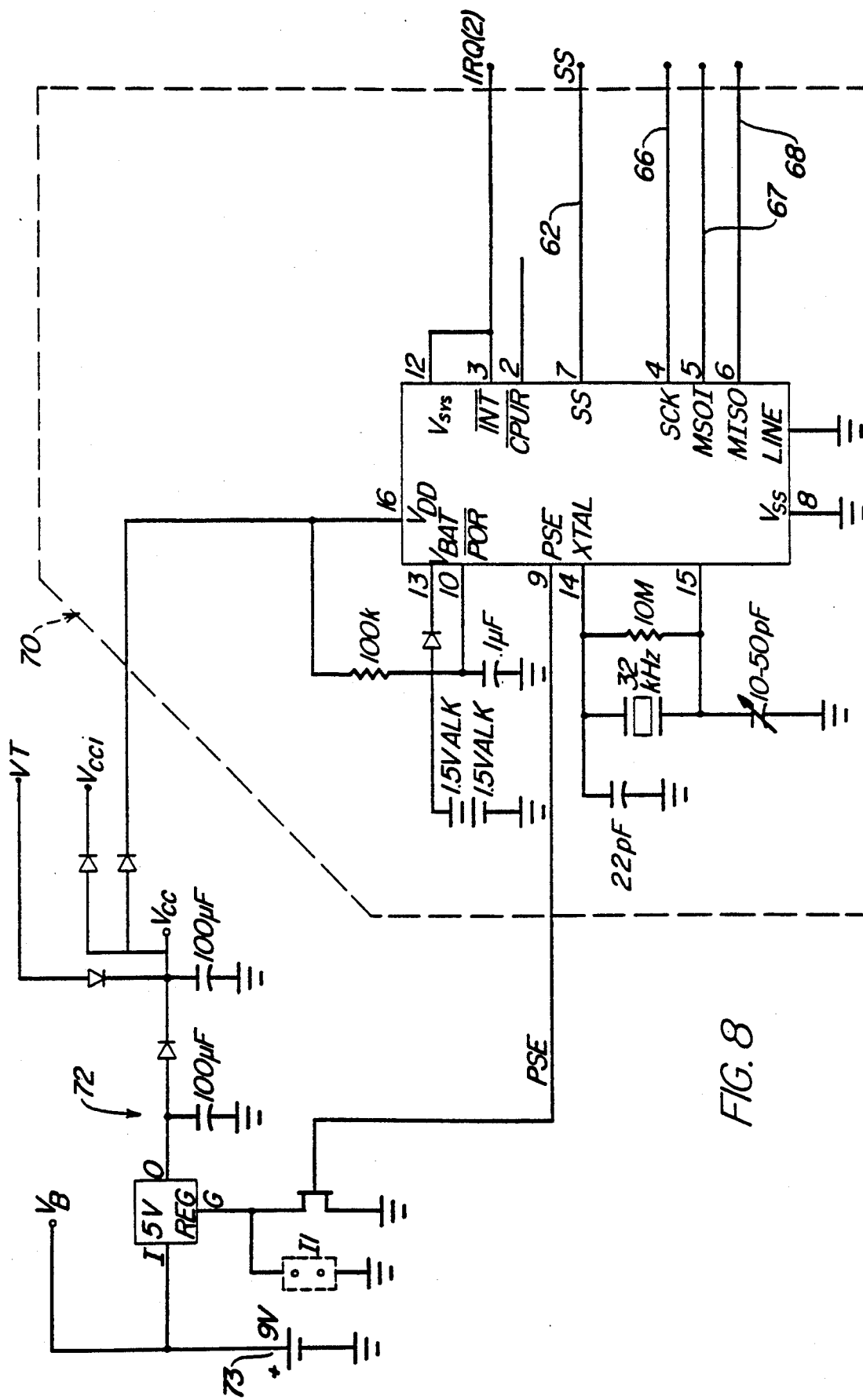
FIG. 8 is a wiring diagram of a real-time clock circuit and a power supply.

As illustrated in FIGS. 5, 7 and 8, input/output line 62 (ss) is connected between input/output port PB, designated as terminal 17 in FIG. 7 of the drawing of microprocessor 60 and through lines 66, 67 and 68 to a power supply and real-time clock chip, generally designated by the numeral 70 provided with random access memory (RAM) and a serial interface. Clock chip 70t is commercially available from Motorola as Part No. MC68HC68T1 which is described in "Motorola, Semiconductor Technical Data Sheet No. MC68HC68T1/D, dated 1988", the disclosure of which is incorporated herein by reference.

The clock/RAM peripheral 70t contains a real-time clock/calendar, a 32×8 static RAM, and a synchronous, serial, three-wire interface for communication with a microcomputer. Operating in a burst mode, successive clock or RAM locations can be read or written using only a single starting address. An on-chip oscillator allows acceptance of a selectable crystal frequency or the device can be programmed to accept a 50/60 Hz line input frequency.

Three pins give clock chip 70t the capability for sensing power-up/power-down conditions, a capability useful for battery-backup systems. The device has an interrupt output capable of signalling the microcomputer 60 of the occurrence of any one of three separately-selectable conditions. An alarm can be set for comparison with the seconds, minutes, and hours registers. This alarm can be used in conjunction with the power supply enable PSE output to initiate a system power-up sequence if the $V_{sys}$ pin is powered up.

A software power-down sequence can be initiated by setting a bit in the interrupt control register. This applies a reset to the CPU, sets the CLK OUT and PSE pins low, and disables the serial interface. This condition is held until a rising edge is sensed on the system voltage ($V_{sys}$) input, signalling system power coming on, or by activation of a previously-enabled interrupt if the $V_{sys}$ pin is powered up.

A watch-dog circuit can be enabled that requires the microcomputer to toggle the slave select (SS) pin of the clock chip 70t periodically without performing a serial transfer. If this condition is not sensed, the CPUR line resets the CPU.

Clock chip 70t is connected through line PSE to a power supply 70p, as illustrated in FIG. 8 of the drawing. Power supply 70p is self contained and is operated from a 9-volt battery 73 which in the particular circuit has an expected life of approximately three years. Power supply 70p provides power to the clock circuit 70t, microprocessor 60 and Hall-effect transducer 40a and 40b on transducer circuit board 40.

Figure 9:
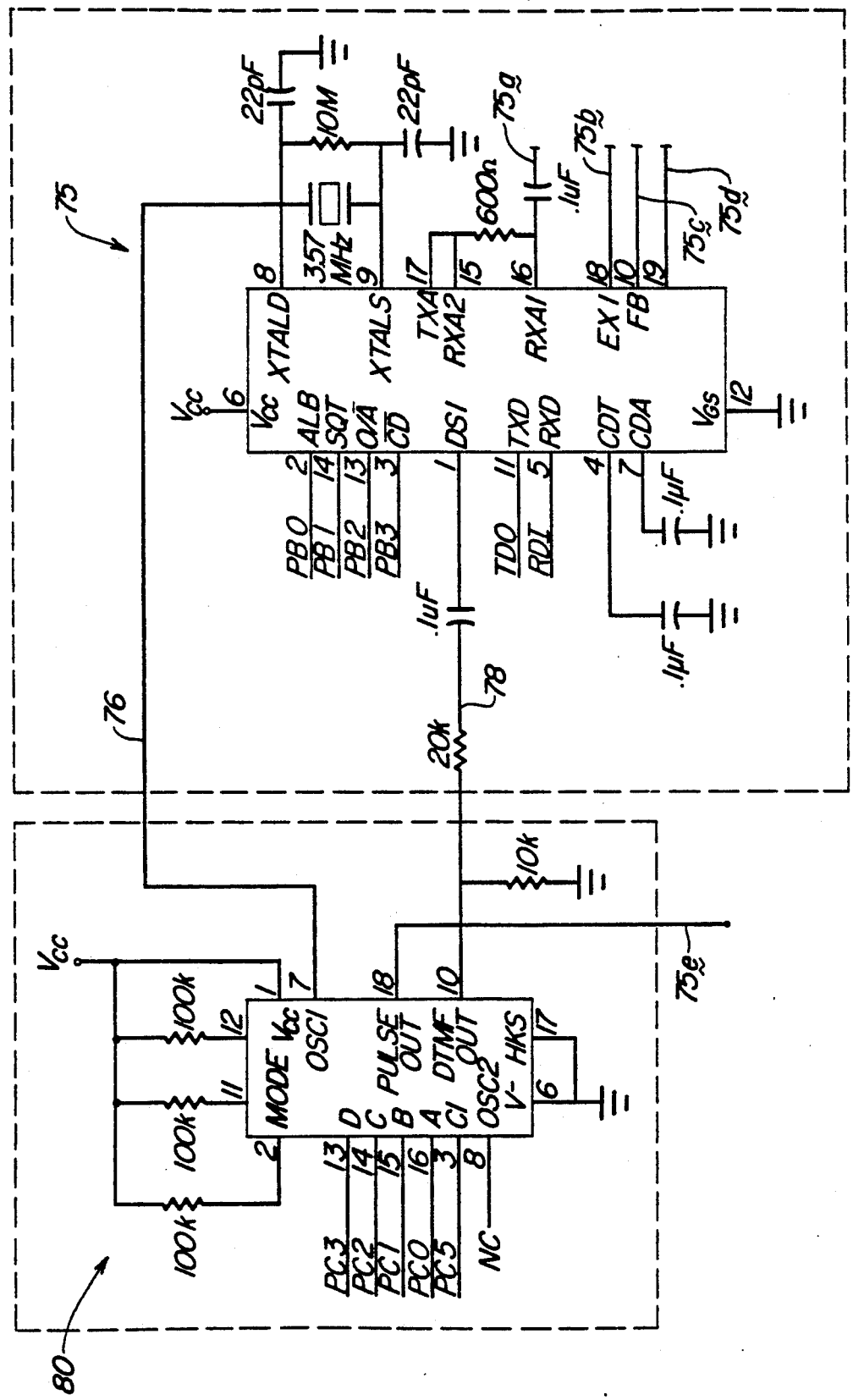
FIG. 9 is a wiring diagram of a modem circuit and an autodialer.
Figure 10:
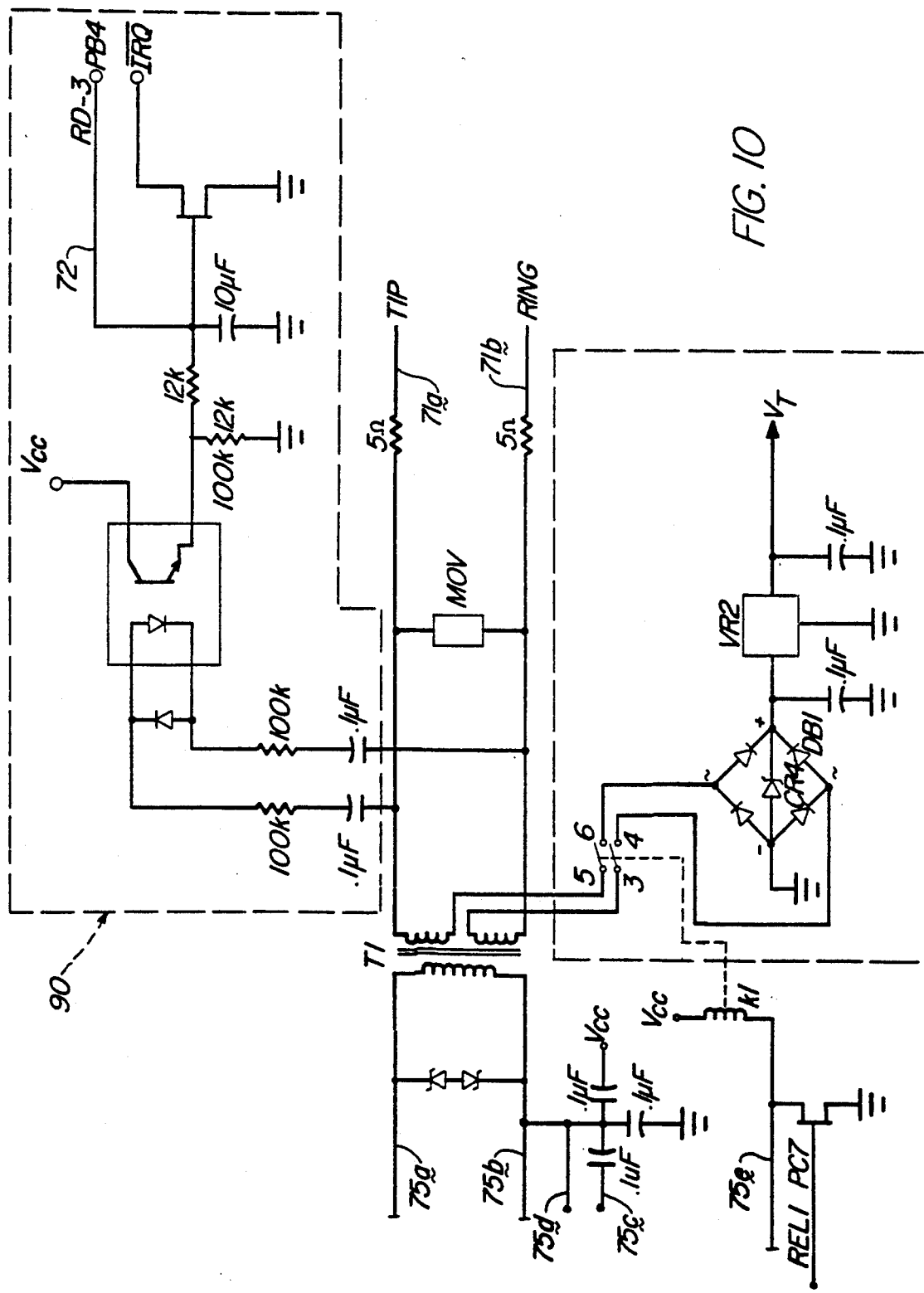
FIG. 10 is a wiring diagram of a public telephone interface.

Referring to FIGS. 5 and 7 of the drawing, terminal PB4 of microprocessor 60 is connected through line conductor 72 (RD-3) to a modem, generally designated by the numeral 75 in FIG. 9 of the drawing which is connected through conductors 76 and 78 to an auto dialer 80.

Modem 75 is a single-chip 300 baud modem which is commercially available from Motorola, Inc. as Part No. MC145443. The modem chip is described in Motorola Semiconductor Technical Data Sheet No. MC145442/D, dated 1987. The technical data sheet is incorporated herein by reference in its entirety for all purposes.

The silicon-gate CMOS single-chip low-speed modem 75 contains a complete frequency shift keying (FSK) modulator, demodulator, and filter. The device provides full-duplex or half-duplex 300 baud data communication over a pair of telephone lines. They also include a carrier detect circuit for the demodulator section and a duplexer circuit for direct operation on a telephone line through a simple transformer.

Auto dialer 80, illustrated in FIGS. 5 and 8, is a single number pulse tone switchable dialer which is commercially available from United Technologies, Mostek as Part No. MK5371, which is described in Mostek Datasheet No. MK5371/MK5372, dated March 1985, the disclosure of which is incorporated herein by reference in its entirety for all purposes.

The auto dialer 80 is a monolithic, integrated circuit manufacture using a Silicon Gate CMOS process. These circuits provide necessary signals for either DTMF or loop disconnect (Pulse) dialing. The dialer buffers up to 28 digits into memory that can be later redialed with a single key input. This memory capacity is sufficient for local, long distance, overseas, and even computerized long-haul networks. Users can store all 12 signaling keys and access several special functions with single key entries. These functions include: Last Number Dialed (LND), Softswitch (Mode), Flash, and Pause.

Conductors 70a, 70b, 70c and 70d (not shown) of cabale interface through a conventional telephone jack 101 to the telephone line 100 in an installation similar to that of an extension telephone line 100. Conductors 75a, 75b, 75c and 75d form cable 71 connected to telephone jack 101 of the outgoing telephone line 100.

From the foregoing it should be readily apparent that transducer unit 30 is connectable to conventional float gauge assembly body 22 without modification to the conventional float gauge system. Transducer unit 30 is provided with a pointer 52 to provide a visual indication of the level of LP gas at the location of LP tank 15. Transducer circuit board 40 is connectable to four conductors 46, 47, 49a and 49b in a conventional four conductor telephone line 48 for connecting transducer unit 30 to signal transmitting interface unit 150 which, as illustrated in FIG. 2 of the drawing may be mounted on the wall of a building adjacent telephone terminal box 101 connected to conventional telephone lines 100 through a four conductor cable 71.

Signal transmitting interface unit 150, mounted in a weatherproof box incorporates modem 75 and autodialer chip 80 which are interfaced to the microprocessor 60 which controls the operation of modem 75 and autodialer 80. The realtime clock 70t determines time windows allocated to the individual transfer unit 30 for communication with central base station 200 over incoming telephone line 100.

Signals from transducer unit 30 are converted in transducer interface circuitry 49 for delivery to the microprocessor 60.

The autodialer 80, illustrated in FIG. 9, is connected through conductors 76 and 78 to modem 75 which is connected through conductors 75a, 75b, 75c and 75d to ring detect circuitry 90 which determines whether or not the incoming telephone line is busy at the time the signal transmitting interface unit 150 is programmed to transmit data over telephone line 100 to central base station 200 or to answering an incoming call from central base station 200, if an incoming call is received at the previously designated time which signal transmitting interface unit 150 is programmed to answer.

Tip line 71a and ring line 71b, the incoming telephone lines from junction box 101, are connected through a conventional RG11C type jack to the telephone line.

The telephone circuitry 95 interfaces with microprocessor 60 through conductor 72 and with real-time clock 70t through conductor SS through port B of the input/output terminals of microprocessor 60. Clock circuit 70t keeps track of precise time in seconds, minutes, hours, day, day of week, month and year. A primary function of clock circuit 70t is to minimize power consumption in the circuitry. Clock 70t turns on microprocessor 60 when it is time to collect signals delivered from Hall-effect transducer 40a and 40b on transducer circuit board 40 in sender 30 monitoring the volume of liquid in a particular tank 15. Based on signals received from transducer unit 30, microprocessor 60 determines whether or not a call to the central base station 200 is to be initiated. As noted above, clock chip 70t turns microprocessor 60 on and off at the designated times.

When a telephone call is received over incoming telephone lines 100, the call is ignored by signal transmitting interface unit 150 if clock 70t has not turned on microprocessor 60. Thus, clock 70t establishes the time window during which the computer at central unit base station 200 is capable of communicating with interface 150. When signals from Hall-effect transducers 40a and 40b indicate that the level of liquid in tank 15 is at a predetermined "low level" or "high level" or if a set pointhigh or low has been passed on the level of tank 15, then microprocessor 60 stores the data and places a call to central base station 200 when clock 70t turns on microprocessor 60 at the previously designated "time window".

When the time window arrives, microprocessor 60, autodialer 80 and modem 75 goes "off-hook" and dials the telephone number of base station 200. If contact is not made, the number is automatically redialed after a specified time interval, for example, every ten minutes, until interface 150 makes contact with the computer at central base station 200 or until the time window has expired. If interface 150 has not made contact with the computer at base station 200 when the time window expires, it will retain the data until the next available time slot or time window which has been previously programmed into the system.

The computer 210 at central base station 200 is provided with telecommunication circuitry to transmit data over telephone line 100 to interface unit 150 and to receive data from a plurality of interface units at various locations.

In the illustrated embodiment computer 210 comprises, for example, an IBM PC, AT, PC/XT or similar compatible microcomputer. The microcomputer preferably has at least one disc drive, at least 512K of RAM, a hard disc drive, a modem and serial or parallel ports for driving a printer.

Supervisory software controls the operation of computer 210 and preferably carries out the following functions:

1. Receive data from remote terminal units 150.
2. Transmit data to remote terminal units 150.
3. Maintain files on each remote unit with current information.
4. Print transaction information between the central unit 200 and each remote signal transmitting interface unit 150.
5. Selectively call individual remote signal transmitting interface units 150 and retrieve tank level information and print the information if desired.
6. Upload remote signal transmitting interface unit files and transaction information for transmission to a host computer 220.

The supervisory software is preferably menu driven and is capable of communicating over a 300 baud modem with selected remote terminal units 150 over standard public telephone lines.

A typical report generated by the supervisory software is illustrated in FIG. 14 of the drawing and preferably identifies the location of the remote unit 150 and other data which may be useful for controlling inventory of several remotely situated storage tanks by a service facility.

It should be readily apparent that computer 210 in the central base station 200 is capable of receiving calls; placing calls; collecting inventory from a plurality of tanks 15; maintaining data files regading the status of each tank; sending reports to a host computer 220; and printing reports periodically to facilitate maintaining required inventories of fuel in a storage facility and scheduling deliveries to minimize repetitive trips.

It should be readily apparent that the remote level sensing apparatus hereinbefore described may be used for controlling the volume of materials other than LP gas and that the hardware and software described may be modified without departing from the spirit and scope of the appended claims.

I claim:

1. Telecommunication apparatus to indicate the level of liquefied gas in a remote tank comprising: a float in the tank; magnetic field generating means; means operably connecting said float for moving said magnetic field generating means as the level of liquefied gas in the tank changes; a pair of Hall effect sensors; means securing each of said sensors outside the tank in a predetermined relationship to said magnetic field, said sensors being adapted for delivering electrical signals in response to a change in the level of liquefied gas in said tank; receiver means mounted remotely from said tank; and telecommunication means associated with said sensors and said receiver means for transmitting electrical signals from said sensors to said receiver means, said receiver means being adapted for indicating the level of liquefied gas in said tank.

2. Telecommunication apparatus according to claim 1, said magnetic field generating means comprising a drive magnet movably mounted in said tank and a slave magnet movably mounted outside of said tank.

3. Telecommunication apparatus according to claim 1, each of said Hall effect sensors comprising: sensor means adapted for measuring the intensity and polarity of the magnetic flux propagated by the drive magnet and the slave magnet.

4. Telecommunication apparatus according to claim 3, said telecommunication means comprising a plurality of electrical conductors; a source of electricity; and a first pair of conductors providing electrical power to said sensors.

5. Telecommunicating apparatus according to claim 1 said means operably connecting said float to move said magnetic field generating means comprising: means pivotally securing said float for rotation about an axis; a drive gear drivingly connected to said float and rotatable about said axis; a driven gear in meshing relation with said drive gear; and drive means operably securing said driven gear to said drive magnet.

6. Telecommunication apparatus to indicate the level of liquid in a tank comprising: a float gauge indicating the level of liquid in the tank; transducer means associated with said float gauge for delivering electrical signals in response to a change of the level of liquid in the tank; signal transmitting means for transmitting electrical signals to a remote location; interface means associated with said transducer means and said signal transmitting means for transferring electrical signals between said transducer means and said signal transmitting means; and control means associated with said transducer means and said signal transmitting means, said control means being adapted for activating said signal transmitting means for transmitting signals to a remote location in response to said interface means delivering signals from said transducer means.

7. Telecommunication apparatus according to claim 6, said control means comprising: clock means adapted for energizing said signal transmitting means at a predetermined time.

8. Telecommunication apparatus according to claim 7, said signal transmitting means comprising a microprocessor; and telephone circuitry adapted for transmitting signals from said interface means to a telephone line.

9. Telecommunication apparatus according to claim 8, said microprocessor comprising means for receiving and storing signals received from said interface means, said control means being adapted for transmitting signals stored by said microprocessor during a predetermined time window.

10. Telecommunication apparatus according to claim 9, said control means being adapted for energizing said signal transmitting means during a predetermined time interval to permit signals received from said telephone circuitry to cause said microprocessor to transmit stored signals.

11. Telecommunication apparatus according to claim 10, said telephone circuitry comprising: ring detector means; dialer means; and a modem, said ring detector means, said dialer and said modem being adapted for delivering signals to said microprocessor and for transmitting signals received from said microprocessor.

12. Telecommunication apparatus according to claim 11, said transducer means comprising: a circuit board; magnetic flux density sensor means secured to said circuit board; magnetic field generating means adjacent said circuit board; and means adapted for moving said magnetic field generating means relative to said circuit board in response to a change in the volume of liquid in the tank.

13. Telecommunication apparatus according to claim 12, said magnetic field generating means comprising: a drive magnet movably mounted relative to said tank; a slave magnet; means movably supporting said slave magnet outside of said tank; and means mounting said circuit board between said drive magnet and said slave magnet such that said drive magnet and said slave magnet move relative to said sensor means in response to a change in the level of the surface of liquid in the tank.

14. Telecommunication apparatus according to claim 12, said magnetic field generating means comprising a drive magnet movably mounted in said tank and a slave magnet movably mounted outside of said tank.

* * * * *

UNITED STATES PATENT AND TRADEMARK OFFICE
CERTIFICATE OF CORRECTION

PATENT NO. : 5,023,806
DATED : June 11, 1991
INVENTOR(S) : Naresh P. Patel

It is certified that error appears in the above-identified patent and that said Letters Patent is hereby corrected as shown below:

Column 2, line 27, change "50" to read -- 150 --;

Column 3, line 40, change "36" to read -- 56 --;
Column 3, line 59, change "for" to read -- face --;
Column 4, line 34, change "transducers" to read -- transducer --;
Column 7, line 18, change "cabale" to read -- cable 71 --;
Column 7, line 25, delete "body";
Column 7, line 42, change "transfer" to read -- transducer --;

Column 8, line 14, delete -- unit --;
Column 9, line 50, change "Telecommunicating" to read
 -- Telecommunication --

Signed and Sealed this

Third Day of November, 1992

Attest:

DOUGLAS B. COMER

Attesting Officer

Acting Commissioner of Patents and Trademarks